(12) United States Patent
Ringer et al.

(10) Patent No.: US 9,797,235 B2
(45) Date of Patent: *Oct. 24, 2017

(54) DRILLING OPTIMIZATION WITH A DOWNHOLE MOTOR

(75) Inventors: Maurice Ringer, Cambridge (GB); Michael P. Barrett, Histon (GB); Benjamin P. Jeffryes, Histon (GB); Walter David Aldred, Thriplow (GB); Ashley Johnson, Milton (GB); Gokturk Tunc, Cambridge (GB); John Cook, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 570 days.

This patent is subject to a terminal disclaimer.

(21) Appl. No.: 13/993,643

(22) PCT Filed: Dec. 13, 2011

(86) PCT No.: PCT/IB2011/003019
§ 371 (c)(1),
(2), (4) Date: Sep. 27, 2013

(87) PCT Pub. No.: WO2012/080812
PCT Pub. Date: Jun. 21, 2012

(65) Prior Publication Data
US 2014/0027175 A1    Jan. 30, 2014

Related U.S. Application Data

(60) Provisional application No. 61/422,420, filed on Dec. 13, 2010, provisional application No. 61/422,412, (Continued)

(51) Int. Cl.
*E21B 44/00* (2006.01)
*E21B 44/02* (2006.01)
(Continued)

(52) U.S. Cl.
CPC ............... *E21B 44/02* (2013.01); *E21B 4/02* (2013.01); *E21B 44/00* (2013.01); *E21B 45/00* (2013.01);
(Continued)

(58) Field of Classification Search
USPC ............................................................ 175/26
See application file for complete search history.

(56) References Cited

U.S. PATENT DOCUMENTS 2,958,511 A    11/1960   Pfefferle
2,958,821 A    11/1960   Webb
(Continued)

FOREIGN PATENT DOCUMENTS

RU        2405099 C2     11/2010
WO        2010043951      4/2010
(Continued)

OTHER PUBLICATIONS

International Search Report and Written Opinion of PCT Application No. PCT/IB2011/003019 dated Aug. 7, 2012: pp. 1-11.
(Continued)

*Primary Examiner* — Taras P Bemko
(74) *Attorney, Agent, or Firm* — Joan Beckner

(57) ABSTRACT

Optimizing the operation of a hydraulically powered rotor and stator driven drill as it drills a wellbore into the earth is described. Drilling optimization is provided measuring a first set of rotor and stator operating parameters including the speed of rotation of the rotor and rotor torque for a first period of time, generating a first set of relationships from the first set of operating parameters to enable the rotor speed and rotor torque to be predicted over a range of operating parameter values, determining from the relationships a first more optimal mode of operation, and changing at least one
(Continued)

operating parameter to move the operation of the rotor and stator towards the more optimal mode of operation.

22 Claims, 7 Drawing Sheets

Related U.S. Application Data filed on Dec. 13, 2010, provisional application No. 61/422,409, filed on Dec. 13, 2010.

(51) Int. Cl.
    *E21B 4/02*     (2006.01)
    *E21B 47/00*     (2012.01)
    *G01P 3/487*     (2006.01)
    *E21B 45/00*     (2006.01)
    *G01P 3/44*     (2006.01)
    *H02K 11/215*     (2016.01)

(52) U.S. Cl.
    CPC .............. *E21B 47/00* (2013.01); *G01P 3/44* (2013.01); *G01P 3/487* (2013.01); *H02K 11/215* (2016.01)

(56) References Cited

U.S. PATENT DOCUMENTS

| | | |
|---|---|---|
| 4,545,214 A | 10/1985 | Kinoshita |
| 4,630,691 A | 12/1986 | Hooper |
| 4,647,853 A | 3/1987 | Cobern |
| 4,941,951 A | 7/1990 | Sheppard et al. |
| 5,368,108 A | 11/1994 | Aldred et al. |
| 5,415,030 A | 5/1995 | Jogi et al. |
| 6,234,259 B1 | 5/2001 | Kuckes et al. |
| 6,498,474 B1 | 12/2002 | Turner |
| 2003/0205998 A1 | 11/2003 | Heremans et al. |
| 2004/0035608 A1 | 2/2004 | Meehan et al. |
| 2004/0251898 A1 | 12/2004 | Morys et al. |
| 2005/0155349 A1 | 7/2005 | Sugiura et al. |
| 2006/0131074 A1 | 6/2006 | Calhoun et al. |
| 2006/0149478 A1 | 7/2006 | Calhoun et al. |
| 2006/0162962 A1 | 7/2006 | Koederitz et al. |
| 2006/0227005 A1* | 10/2006 | Fincher ............... E21B 47/12 340/855.4 |
| 2006/0279243 A1 | 12/2006 | Schachtl et al. |
| 2008/0156531 A1 | 7/2008 | Boone et al. |
| 2008/0164062 A1 | 7/2008 | Brackin et al. |
| 2008/0170841 A1 | 7/2008 | Schneider et al. |
| 2009/0039872 A1 | 2/2009 | Fischer |
| 2009/0236149 A1 | 9/2009 | Main |
| 2010/0301846 A1 | 12/2010 | Lee |

FOREIGN PATENT DOCUMENTS

| | | |
|---|---|---|
| WO | 2010065646 | 6/2010 |
| WO | 2012080810 | 6/2012 |
| WO | 2012080819 | 6/2012 |

OTHER PUBLICATIONS

International Search Report and Written Opinion of PCT Application No. PCT/IB2011/003017 dated Aug. 30, 2012: pp. 1-10.
International Search Report and Written Opinion of PCT Application No. PCT/IB2011/003045 dated Sep. 17, 2012: pp. 1-11.

\* cited by examiner

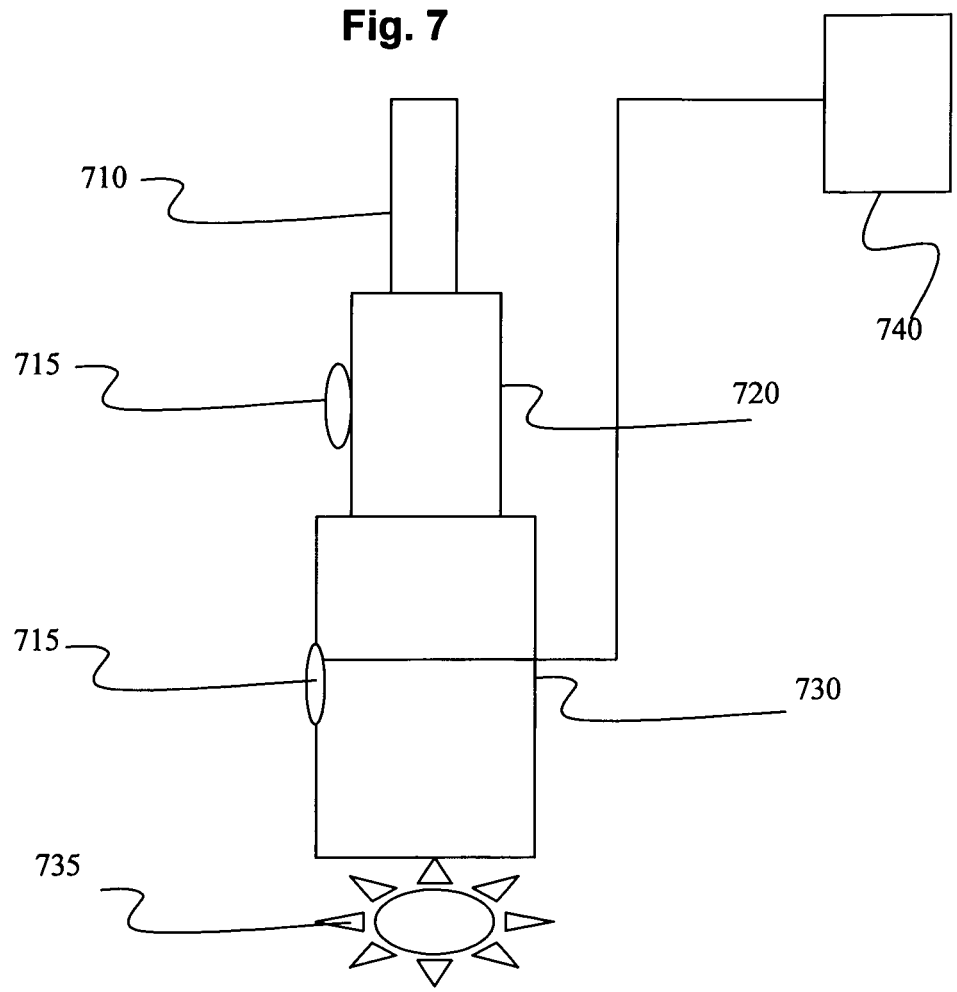

DRILLING OPTIMIZATION WITH A DOWNHOLE MOTOR

CROSS-REFERENCE TO RELATED APPLICATIONS

This application is a United States National Stage Application under 35 U.S.C. §371 and claims priority to Patent Cooperation Treaty Application Number PCT/IB2011/003019 filed Dec. 13, 2011, which claims the benefit of U.S. Provisional Patent Application Ser. Nos. 61/422,420 filed Dec. 13, 2010; 61/422,412 filed Dec. 13, 2010; and 61/422,409 filed Dec. 13, 2010. All of these applications are incorporated herein by reference in their entireties.

TECHNICAL FIELD

Embodiments of the present invention relate to a method of optimising the operation of a downhole drill comprising a drill bit connected to a rotor within a stator e.g. a positive displacement motor or turbine.

BACKGROUND

Downhole motors are used in the hydrocarbon industry to deliver mechanical power at a downhole location to a drill bit in oil and/or gas wells for drilling applications. The downhole motor, sometimes referred to as a mud motor, is positioned at the bottom of a drillstring and coupled via an output shaft with a drill bit. Drilling fluid, sometimes referred to as drilling mud or simply mud, is pumped down the drillstring and through the downhole motor. The downhole motor uses the force of the pumped/flowing drilling fluid to produce a mechanical output, a rotation of the output shaft and, in turn, the drill bit.

Although there are different types of downhole/mud motors, the most commonly used type today is a positive displacement motor which uses an elongated, helically-shaped rotor within a corresponding helically shaped stator. The flow of drilling fluid or mud between the stator and rotor causes the rotor to orbit within the stator eccentrically about the longitudinal axis of the stator. The rotor itself rotates about its longitudinal axis and also orbits around the central longitudinal axis of the stator. This eccentric orbit and rotation of the rotor is transferred by a suitable transmission assembly, such as a universal joint assembly, to produce a concentric rotation for the output shaft.

The downhole motor is a kind of downhole dynamic drilling tool that converts the power of drilling mud to a rotation of the drill bit; an application of torque and speed to the drill bit. The advantages of using a downhole motor is that it provides: an increased rate of penetration; better hole deviation control; reduced drill string failure rate.

A downhole motor, mud motor or drilling motor may also be referred to as a Progressive Cavity Positive Displacement Pump that may be disposed on the drillstring to provide additional power to the bit during a drilling process. As described above, the downhole motor uses the drilling fluid to create eccentric motion in the power section of the motor, which is transferred as concentric power to the drill bit. The downhole motor uses different rotor and stator configurations to provide optimum performance for the desired drilling operation; typically the number of lobes and the length of power assembly may be increased to provide greater horsepower. In certain applications, compressed air or other compressed gases may be used to input power to the downhole motor. A rotation of the bit while using a downhole motor may be from about 60 rpm to over 100 rpm.

Downhole motors may comprise a top sub, which connects the downhole motor to the drillstring; the power section, which consists of the rotor and the stator; the transmission section, where the eccentric power from the rotor is transmitted as concentric power to the bit; the bearing assembly which protects the tool from off bottom and on bottom pressures; and the bottom sub which connects the downhole motor to the bit.

The use of downhole motors is greatly dependent on financial efficiency. In straight vertical holes, the mud motor may be used for increased rate of penetration (ROP), or to minimize erosion and wear on the drill string, since the drill string does not need to be turned as fast. However, the majority of downhole motor use is for directional drilling. Although other methods may be used to steer the drill to directionally drill a borehole, a downhole motor may be the most cost effective method.

In some aspects, the downhole motor may be configured to have include a bend section to provide for directional drilling. Typically, downhole motors can be modified in a range of around zero to four degrees to provide for directional drilling with approximately six increments in deviation per degree of bend. The amount of bend is determined by rate of climb needed to reach the target zone. By using a measurement while drilling (MWD) Tool, a directional driller can steer the bit, which is driven by the downhole motor, to the desired target zone.

The power section of the downhole motor consists of the stator and the rotor. In certain downhole motors, the stator comprises a rubber sleeve on the wall of a steel tube, where the inside of the rubber sleeve defines a spiral structure with a certain geometric parameter. The rotor comprises a shaft, such as a steel shaft, that may be coated with a wear resistant coating, such as chrome and may have a helical profile configured to run/turn/rotate inside the stator.

In the drilling procedure, drilling fluid is pumped downhole through the drill pipe at a given rate and pressure. The downhole motor converts the hydraulic energy of the drilling fluid passing through the power section into mechanical energy, rotation and torque. This mechanical energy is transferred from the downhole motor to the drill bit.

An alternative to using a positive displacement motor is to employ a turbine, in a process often referred to as turbodrilling. In the turbodrill method, power is generated at the bottom of the hole by mud-operated turbines. The turbodrill consists of four basic components: the upper, or thrust, bearing; the turbines, the lower bearing; and the bit. In operation, mud is pumped through the drill pipe, passing through the thrust bearing and into the turbine. In the turbine, stators attached to the body of the tool divert the mud flow onto the rotors attached to the shaft. This causes the shaft, which is connected to the bit, to rotate. The mud passes through a hollow part of the shaft in the lower bearing and through the bit, as in rotary drilling, to remove cuttings, cool the bit, and perform the other functions of the drilling fluid. The capacity of the mud, which is the power source, determines rotational speed.

Multistage high efficiency reaction turbine blades extract hydrolic energy from the flowing mud stream and convert it to mechanical energy (torque and rotation) to drive the drill bit. Each turbine stage consists of a stator, fixed to the body of the tool, and a rotor fixed to the output shaft. These are designed to work in unison, directing and accelerating the mud as it passes through each stage. To achieve the high power and torque levels necessary in performance drilling applications, complete tools are built with approximately 150 sets of identical rotor and stator pairs. To ensure a long life the rotors and stators are manufactured using high performance alloys, which are resistant to both erosion and corrosion.

Similar to a positive displacement motor, the turbodrill generates mechanical power through a pressure drop across the drive system coupled with the fluid flow rate. Generally, the greater the pressure drop capacity of the tool, the greater the potential for delivering mechanical power to the bit. Because the turbodrill power generation system is entirely mechanic, it is capable of supporting an extremely high pressure drop that creates greater mechanical power compared with a mud motor.

In view of their benefits positive displacement motors (PDMs) and turbines are used prolifically in oilfield drilling operations to increase the rotary speed and torque supplied to the bit during drilling.

Although widely used in oilfield drilling operation, the performance of the downhole motor how, such as much rotary speed and torque is generated in the downhole motor during a downhole drilling operation, is generally unknown. Manufacturers of the motors do provide a guide to the performance of the motor. These guides can take the form of a chart relating the torque and rotation speed of the rotor as a function of pressure drop across the motor of the fluid driving the motor. As such, performance of the downhole motor may be estimated by a response chart and the measured pressure drop. However these charts are generated under surface conditions and using an ideal fluid such as water and so may not accurately reflect the performance of the downhole motor under downhole conditions, wear, when being driven by non-water fluids and/or the like. Consequently, an operator of a downhole motor may not know how the downhole motor is operating and/or how best to operate the downhole motor.

During a downhole drilling operation the downhole conditions give rise to a wide variety of sources of deviation from the manufacturer's performance charts. Such sources of deviation include extremes of temperature and pressure, variation in the properties of the drilling mud, wear of the motor and associated components. All of these can influence the performance of the motor and result in the manufacturer's charts losing accuracy.

Drilling operators in the field are aware of this source of deviation and as a result do not rely on the accuracy of manufacturer's performance charts. As such they tend to drill more conservatively than the charts would indicate were possible, to avoid pushing the drill beyond the point of optimal performance and risk stalling the drill. The effect of this is that downhole motors and turbines are generally operated sub-optimally, operating below the maximum power output and efficiency possible.

Additionally, the speed of rotation of the drilling motor or turbine may be extremely important in controlling the direction of drilling of the drilling system, ROP, stability of the drilling system, vibration of the drilling system, effectiveness of the drilling system and/or the like. As such, to effectively operate a drilling system using a downhole motor in essentially real-time it is important to determine the rotational properties of the downhole motor or turbine.

Furthermore, published manufacture curves are often not available for turbines and drillers have only theoretical approximations as to the turbine's speed or power output, making their efficient operation even more problematic.

SUMMARY

In a first aspect, embodiments of the present invention relate to a method of optimising the operation of a hydraulically or pneumatically powered rotor and stator driven drill as it drills a wellbore into the earth, the method comprising:
(a) measuring a first set of rotor and stator operating parameters including the speed of rotation of the rotor and rotor torque for a first period of time,
(b) generating a first set of relationships from the first set of operating parameters to enable the rotor speed and rotor torque to be predicted over a range of operating parameter values,
(c) determining from the relationships a first more optimal mode of operation,
(d) changing at least one operating parameter to move the operation of the rotor and stator towards the more optimal mode of operation.

In an embodiment of the present invention, measurements, either made directly or indirectly, are made of the operating parameters of the downhole rotor and stator and used to generate predictive performance relationships from the downhole measured parameters. These predictive relationships may then be used in place of manufacturers charts, as they have been obtained by taking into account all of the sources of deviation from the manufacturers charts for the time period specified.

Such relationships are therefore based on real data and the only sources of error are the accuracy of the measurements made and how well the relationships fit the measured data.

BRIEF DESCRIPTION OF THE DRAWINGS

Embodiments of the present invention will now be illustrated with reference to the following examples and with reference to the following drawings in which:

FIG. 7 is a schematic-type illustration of a downhole motor system for drilling a borehole, in accordance with an embodiment of the present invention.

DESCRIPTION

Figure 1:
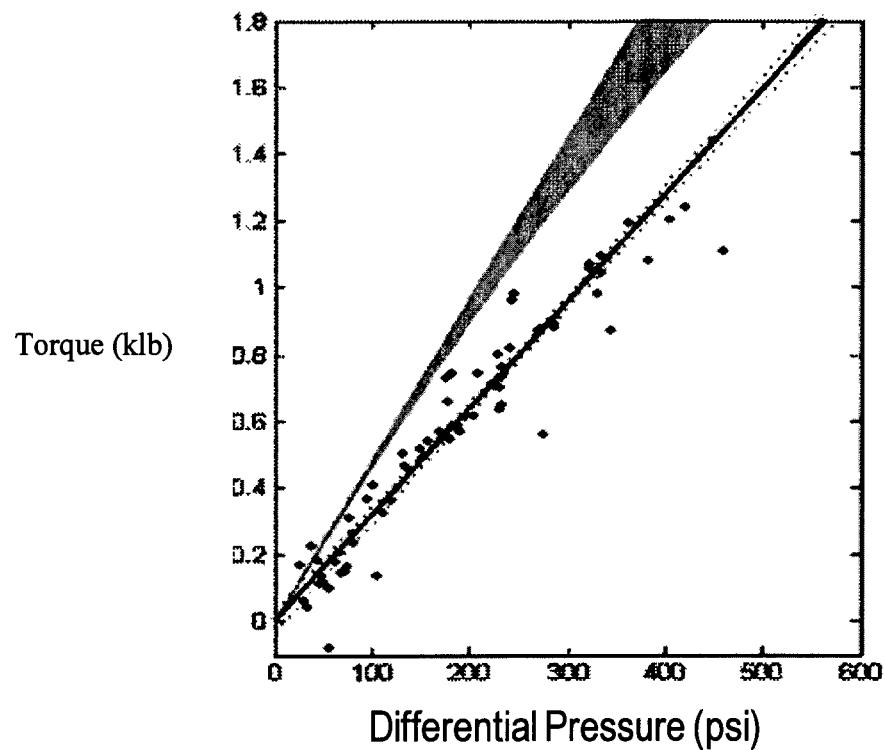
FIG. 1 is a chart showing the torque of a downhole rotor as a function of differential pressure across the rotor, in accordance with an embodiment of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth herein.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In this specification the term drilling turbine, shaft, drive shaft and/or rotor may be used interchangeably to describe the element(s) rotating in the downhole motor and driving the rotation of the drill bit.

Embodiments of the present invention, allow, among other things, for a more accurate determination of the operating state of the rotor and stator, allowing the drilling operator to more confidently operate a drilling system in an optimal manner and without fear of causing the drill/downhole motor to stall.

As discussed above, the rotor and stator may form a positive or cavity displacement motor, a turbine and/or the like. However, other rotor and stator arrangements are also possible.

The rotor can be hydraulically or pneumatically powered. This is carried out by application of a fluid, either a liquid or a gas, which transmits power to the rotor. In the downhole motor the rotor/turbine is driven to rotate by a fluid flowing through the motor and this rotation is used to drive the drill to drill a borehole.

In embodiments of the present invention, the operating parameters of the downhole motor may be made directly or inferred from other measurements.

In embodiments of the present invention, the measurements to be made may vary but it is required that at least a direct or indirect measurement of the speed of rotation of the rotor and of the torque provided by the rotor, is required.

In embodiments of the present invention, a direct measurement of the speed of the motor can be made downhole in the vicinity of the motor and can be carried out by any known method in the art. However, if this is not possible, then indirect methods can be employed to infer the rotation speed such as by monitoring vibration of the downhole motor.

In general, in some embodiments of the present invention, all measurements are made downhole, in order that the downhole conditions are accurately established and/or the operation of thew downhole motor under this conditions established. However, this is not always possible, and in certain aspects, some downhole parameters and operation characteristics of the downhole motor may be inferred from measurements made at the surface.

In embodiments of the present invention, in some cases, the measurements may be combined with any prior measurements or data, in order to infer the measurement desired. Examples of such earlier measurements include dynamometer tests or previous bit runs.

In accordance with an embodiment of the present invention, one important measured operating parameter is the torque produced by the rotor. In some aspects, the torque can be measured directly and downhole e.g. by use of a strain gauge. However, in other aspects, the torque can be inferred from a measurement of torque of the drillstring measured at the surface.

In accordance with an embodiment of the present invention, the torque measured at the surface can be thought of as having two components; i.e. the torque driving the drill bit per se and the frictional forces experienced by the outer casing of the drill string as it rotates in the wellbore. Thus, in one embodiment, by operating the drill "off-bottom," the torque measured at the surface can be taken to be equal to the well friction component. Once known, in accordance with an embodiment of the present invention, any measured increase in torque at the surface from this base point during drilling can be taken to be due to torque applied to the drill bit generated by the motor downhole. This is therefore an example of an indirect measurement of torque, combining the torque measured at the surface with a prior measurement of frictional torque when the drill was off-bottom in order to infer the torque generated by the rotor and stator.

In embodiments of the present invention, other operating parameters which are important to measure include the hydraulic power transmitted to the rotor. In one embodiment of the present invention, the hydraulic power transmitted to the rotor can be measured by separately measuring the pressure drop of the mud due to energy transfer to the rotor and measuring the flow rate of the mud through the rotor and stator.

In some embodiments, the pressure drop of mud due to energy transfer to the motor can be inferred from surface measurements of pressure. This is because the pressure at the surface sometimes referred to as the "standpipe pressure" can be taken as made up at two components. The first component is the frictional pressure lost in pumping the mud down the drill string, through the motor and back up the annulus. The second component is the additional pressure lost due to energy transfer to the motor. Thus, if the first component can be estimated, then the second component, which is the measurement of interest, can be inferred from the standpipe pressure measurement.

Once the measurements have been made, in embodiments of the present invention, the next step in the method is to establish relationships from the measured data. One relationship is the relationship between the torque generated by the rotor (T) and the pressure drop due to hydraulic energy transfer to the rotor $\Delta P$.

In accordance with an embodiment of the present invention, it can be shown, for example, for a positive displacement motor, that to a first approximation:

$$T = a\Delta P$$

In accordance with an embodiment of the present invention, from measurements of T and $\Delta P$ the constant "a" can be processed, for example by regression techniques or the like. In accordance with an embodiment of the present invention, once the constant "a" is found then the relationship between T and $\Delta P$ is derived. In embodiments of the present invention, other relationships concerning the operation of the downhole motor may be employed provided that sufficient measurements are made to enable the unknown values of the constants to be determined.

In embodiments of the present invention, another relationship used to characterize the operation of the downhole motor is the relationship between the speed of rotation of the rotor (S) and the pressure drop due to hydraulic energy transfer to the rotor ($\Delta P$). In accordance with an embodiment of the present invention, it can be shown, for example, that for a positive displacement motor, that to a first approximation:

$$S = a_1 \Delta P^2 + a_2 Q$$

when $a_1$ and $a_2$ are constants and Q is the flow rate of drilling mud. As such, in one embodiment of the present invention, from measurements of S, $\Delta P$ and Q, the constants $a_1$ and $a_2$ may be processed, for example by regression techniques or the like. In accordance with an embodiment of the present invention, establishing these relationships enables both the torque and speed to be known and predicted for a given pressure drop and flow rate of mud.

In embodiments of the present invention, rotor torque and speed are of particular relevance because it is these parameters which are provided by the motor manufacturer to characterize operation of the downhole motor. Thus, in embodiments of the present invention, an accurate model of torque and speed is obtained from actual measured data in real-time.

As discussed above, in embodiments of the present invention, once the relationships for operation of a downhole motor are established, the next step is to employ the relationships to determine an optimal mode of operation of the downhole motor.

Typically, it will be desirable to operate the motor or turbine to maximise the mechanical power generated. As is known to the person skilled in the art, the power delivered by the motor or turbine can be given by the product of the torque generated and the speed of rotation of the rotor. Thus, in accordance with an embodiment of the present invention, by combining the torque and speed relationships, a relationship for mechanical power can be obtained and a more optimal, i.e. greater mechanical power, operating point can be determined.

In order to move towards the more optimal mode of operation, in accordance with an embodiment of the present invention, an operating parameter may be adjusted. In certain aspects, the parameters to be adjusted may be chosen from, for example, weight applied to the drill bit, rotation speed of the drill string and flow rate of mud through the drill and motor. Thus, in accordance with an embodiment of the present invention, the relationships can be transmitted to the a surface drilling operator so that he can make as assessment of the current drilling performance and the location of a more optimal mode of operation.

For example, in accordance with an embodiment of the present invention, an increase in weight-on-bit may be used to provide an increase in torque generated by the motor, provided that the motor does not stall. Likewise, in accordance with an embodiment of the present invention, an increase in mud flow rate may be used to increase the torque generated by the motor, subject to other constraints in the system on mud flow rate.

Alternatively, in some embodiments of the present invention, the relationships and current operating performance can be used to feed into an automated control apparatus to adjust operating parameters in order to move towards the more optimal mode of operation. Once the more optimal mode of operation has been arrived at, the relationships employed to get there may, however, no longer be entirely accurate. This is because the motor may now be operating based on extrapolated performance from the predictive relationships.

Therefore, in some embodiments, once at the first more optimal mode of operation, the method of some embodiments of the present invention is carried out again to measure a second set of rotor and stator operating parameters, generate a second set of relationships to determine a second more optimal mode of operation, and to alter the operating parameters to move towards the second more optimal mode of operation.

If necessary or advantageous, the method of the invention discussed above can be repeated again or as often as desired, until no further optimisation of the performance of the rotor are found.

As described above, such repeated action can be carried out manually by a skilled drilling operator or, for example, as part of an automated control scheme. However, even when the most optimal mode of operation has been arrived at, the method of the invention can provide further benefits and advantages as drilling progresses.

As the drill continues to drill into the earth, the performance of the rotor and stator can change with time. This can be due to a number of factors such as changes in temperature and pressure or a change in the properties of the drilling mud. Additionally the motor may experience wear and its performance affected accordingly. Thus, certain embodiments of the present invention can also be used to monitor the performance of the drill as drilling progresses, acting as a diagnostics tool, e.g. for mechanical failure.

Thus, once the more optimal mode of operation has been found, such changes to the performance of the drill may result in a shifting of the more optional mode of operation as drilling progresses. Such changes may be gradual, e.g. in the case of mechanical wear or changes in temperature and pressure, or can be sudden, e.g. in the case of mechanical failure or a change in the lithography of the rock being drilled into.

In some embodiments, even after the most optimal mode of operation may have been determined, the method of the invention as discussed above may be carried out again at a later period of time i.e. when the drill has progressed further into the earth. This will result in a further set of measured operating parameters, which may be employed to generate a further set of relationships for use in controlling/monitoring operation of the downhole motor. The further set of relationships may indicate a new further more optimal mode of operation. The operating parameters can then be altered to move towards this new further mode of operation.

As before, the steps of measuring and finding a more optimal mode of operation can be carried out repeatedly until no further more optimal modes of operation can be found. Thus, in some embodiments, the method can be repeated as often as desired. In one embodiment, the measured parameters and relationships in the method discussed above are continuously updated in real-time as the drill proceeds.

Thus, embodiments of the present invention can provide a real-time determination of the hydraulic performance of the rotor and stator, to enable continuous adjustment, optimisation and/or diagnostics as drilling progresses.

A field test was performed at the Schlumberger Cameron Test Facility. The purpose of the test was to use real-time downhole measurements to study the performance of drilling motors and turbines, to optimize the operation of the drill.

The field experiment used a bottom-hole apparatus (BHA). The BHA was connected to a 6¾ PDC bit. Above this bit was at least one of a mud motor and a 4¾ inch turbine with blades. This was connected via a probe to a measuring-while-drilling ("MWD") tool. The MWD tool was modified to determine the speed and position of the shaft of the motor or turbine and to transmit it to the surface in real-time. In addition, the BHA was fitted with a drilling dynamics board ("DDB"), a compact board containing multiple sensors, power and memory. DDBs were placed at three locations along the BHA: in the bit, in the collar of the motor or turbine, and in a short sub placed directly above the MWD. Nine BHAs were run during the experiment that tested both the motor and turbine, as well as a number of different bits and stabilizer positions.

The MWD tool was used during the test as its modular architecture meant it was fast to implement the modifications necessary to measure motor speed. The tool attached to a rigid "probe" that screwed into a small bore made in the top of the rotor catcher that connects to the top of either the motor or turbine. During the experiment, the probe ran inside a stabilizer that sat between the motor/turbine and the MWD tool.

The angular position and rotation speed of the probe was measured by the MWD tool using two magnets and an induction coil. These signals were transmitted to the surface in real-time using the MWD's emag link as well as being stored to the tool's memory at 600 Hz sample rate. In accordance with an embodiment of the present invention, the real-time signals generated in the test provided new/ never-before-seen information on the performance of the motor and turbine and were essential in constructing the performance characteristics and real-time optimization discussed in the following sections.

In embodiments of the present invention, provided the drillstring is rotating and assuming that wellbore friction is constant, the torque at the motor and the differential pressure across it can be estimated from surface measurements of drilistring torque and pump pressure respectively. This may be done by subtracting out the off-bottom values of these measurements when drilling. Using this procedure, in accordance with an embodiment of the present invention, the relationship between motor torque and differential pressure in real-time may be generated. An example of this processing is shown in FIG. 1. In the test of the methods in accordance with certain embodiments of the present invention, it was found that the torque generated by the downhole motor was less than that predicted by the published curves (generated by surface tests) supplied with the downhole motor.

In accordance with an embodiment of the present invention, to construct a model of motor speed, downhole measurements are required. During the field test, the downhole measurements were made using the MWD system described above. In accordance with an embodiment of the present invention, because motor speed is a function of mud flow, the relationship between speed and differential pressure was examined at different flow rates.

Figure 2:
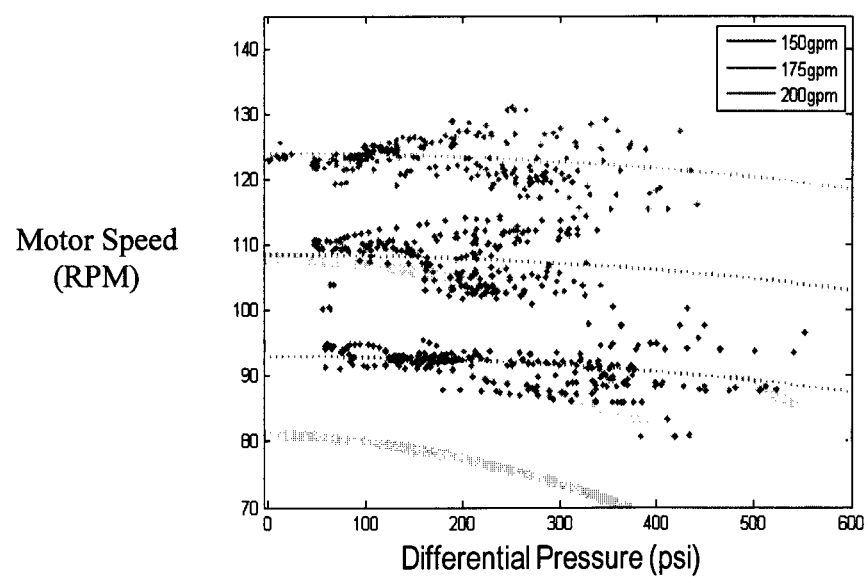
FIG. 2 is a chart of the rotation speed of the rotor as a function of differential pressure across the rotor at three different drilling mud flow rates, in accordance with an embodiment of the present invention.

An example of this is shown in FIG. 2. As can be seen from this example, the measured speed from the motor was often 10-20% higher than predicted by the published motor performance curves. Also, the roll-off (the rate at which the motor speed drops with increasing differential pressure) was significantly less severe than predicted.

Figure 3A:
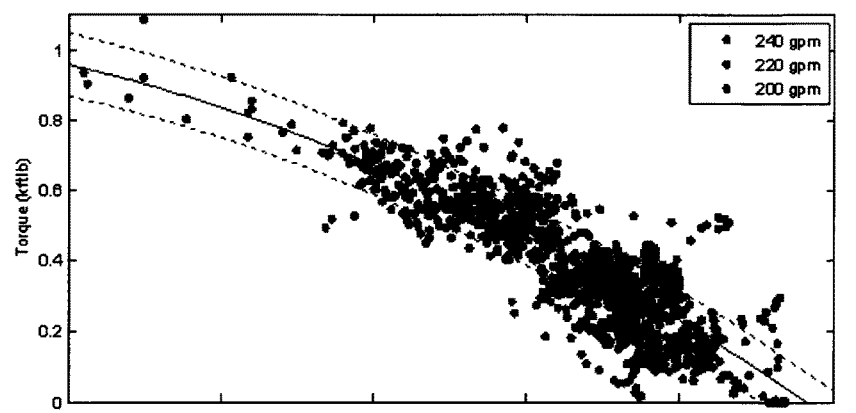
FIG. 3a is a chart of the torque measured on the rotor of a turbine as a function of rotational speed, in accordance with an embodiment of the present invention.
Figure 3B:
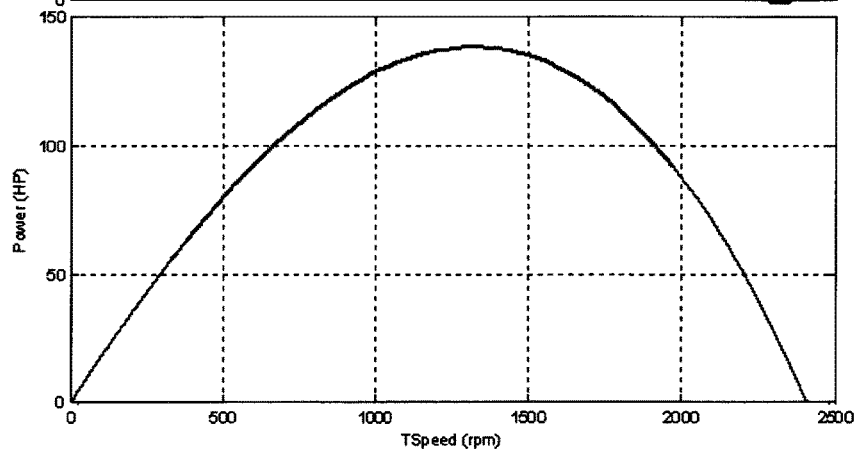
FIG. 3b is a chart of the power generated by the turbine of FIG. 3a as a function of rotational speed, in accordance with an embodiment of the present invention.
Figure 3C:
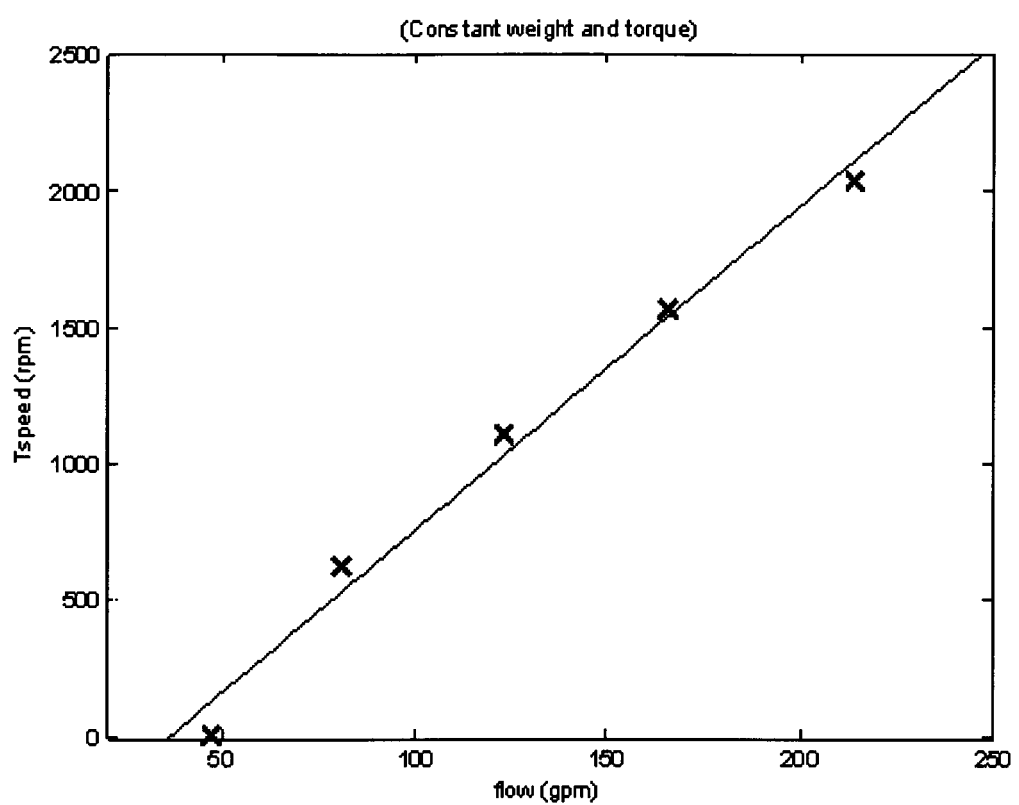
FIG. 3c is a chart showing the measured rotational speed of the turbine as a function of flow rate of drilling mud through the turbine, in accordance with an embodiment of the present invention.

Drilling turbines generate a relatively constant pressure drop, so typically only the relationship between torque, speed and power are considered. As was done when drilling with mud motors, the downhole torque was estimated from the surface torque, however, it should be mentioned that this technique is far more susceptible to errors when drilling with a turbine, as the torque generated by the turbine is considerably less than by a mud motor and can often be masked by the wellbore torsional friction. In an embodiment of the present invention, downhole motor/turbine performance curves were generated in real-time using actual downhole measurements. The downhole motor/turbine performance curves generated using the real-time data in accordance with an embodiment of the present invention, available during the field test is shown in FIGS. 3a-c. In this case, there were no published curves to compare against, as turbines are not as routinely subjected to the same dynamometer surface tests that mud motors are.

An optimization algorithm according to an embodiment of the present invention was tested during the field experiment. The algorithm was run while drilling with a mud motor, and proceeded as follows:

At the onset of the test, the algorithm did not instruct the driller and instead only absorbed the necessary operating parameter measurements to build the initial models of motor and bit performance. During this time, the driller used a weight of no more than 5 klb and a drillstring rotation speed of 40 rpm, which were the parameters he had been using previously during the field experiment.

Figure 4:
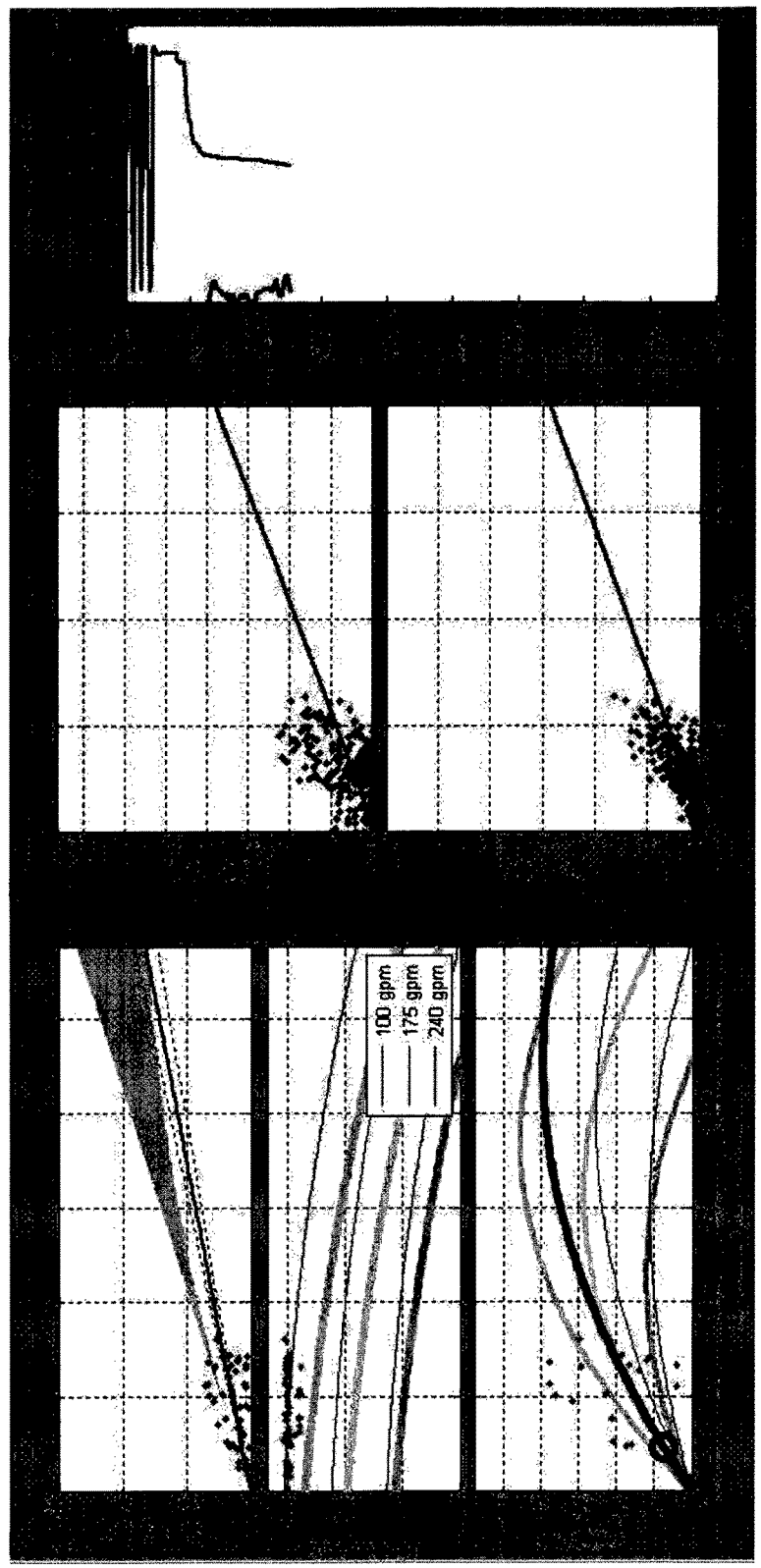
FIG. 4 shows a variety of charts showing the torque, speed and resulting power output of a drilling motor as a function of differential pressure across the rotor, in accordance with an embodiment of the present invention. The charts compare manufacturer's provided data (shaded bands) measured data (indicated by the points) and best fit curves to the measured data (indicated by the solid lines). Also shown are charts of the degree of cut (DOC) and torque as a function of weight on bit (W).

The results of the algorithm during this initial period can be seen in FIG. 4. In this figure, the motor performance curves estimated from the real-time measurements are shown on the leftmost plot. On this plot, measurements are indicated by the points and the solid lines represent the regression fits. Also on this plot are thick faint lines representing the published motor curves. As was mentioned above, the motor was generating less torque and more speed than was expected by published curves.

The motor output power is shown at the bottom left of FIG. 4. As can be seen, the driller's choice of operating parameters was generating up to about 300 psi of differential pressure (the black circle in this plot shows the driller's current operating point), however the curve has a maximum of about 900 psi, suggesting that the driller is using only about a third of the maximum power available from the motor. The top left plot shows that 900 psi differential pressure corresponds to about 2.5 kftlb of downhole torque.

The middle two plots in FIG. 4 show the relationship between weight, torque and depth-of-cut (the distance drilled per revolution of the bit). Thus, the real-time models suggest that should the driller push the weight up to 17 klb, the motor would output its maximum power and the depth-of-cut would be maximized.

Figure 5:
FIG. 5 is a similar plot to that of FIG. 4 wherein the measured data has been measured over a broader range of differential pressures, in accordance with an embodiment of the present invention.
Figure 6:
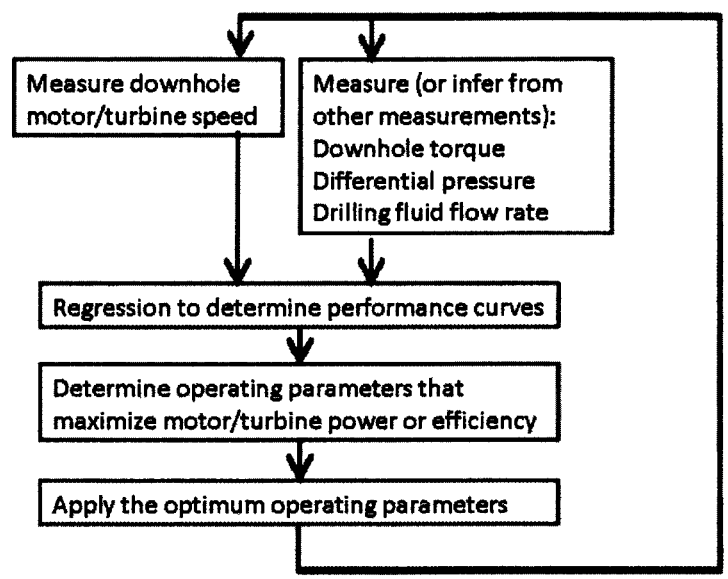
FIG. 6 is a flow chart indicating schematically how the method of the invention is carried out, in accordance with an embodiment of the present invention.

The driller was then instructed to apply 15 klb of weight. The results of this are shown in FIG. 5. Once again, the motor performance curves are shown on the left of this figure and now show measurements (the dots) up to about 900 psi differential pressure. The model curves are continuously updated and have adjusted slightly with the new measurements, showing that the maximum motor output power now appears to occur at about 1000 psi differential pressure.

It is interesting to note that the predicted motor power curves (the faint red line in the lower right plot) suggest that the max output power of the motor occurs at about 700 psi differential pressure. It is only by using real-time measurements In accordance with an embodiment of the present invention, that the true motor power curve can be seen.

At this point in the test, it was established that 15 klb was an almost optimal weight to apply, as it generated almost the maximum output power of the motor. In accordance with an embodiment of the present invention, the real-time measurement of motor performance provided immediate feedback as to the operating point along the motor's power curve and also highlighted some differences with the published curves.

In accordance with an embodiment of the present invention, the measured curves may also be used to optimize the instantaneous power or efficiency of the motor, and by monitoring these curves over time, in accordance with an embodiment of the present invention, performance degradation, motor wear and the onset of motor failure may be detected.

Furthermore, In accordance with an embodiment of the present invention, the above analysis can be repeated or continuously updated as drilling progresses in order to monitor and react to any movement in the optimal operating mode of the drill.

FIG. 7 is a schematic-type illustration of a downhole motor system for drilling a borehole, in accordance with an embodiment of the present invention. In the system, a bottomhole assembly 730 comprises a drill bit 735. A downhole motor 720 is coupled with the bottomhole assembly and configured to power the drill bit 735. The bottomhole assembly 730 and the downhole motor 720 may be suspended in the borehole on a drillstring 710, which may comprise casing, drill pipe, coiled tubing and/or the like.

One or more sensors 715 may sense/measure parameters associated with operation of the downhole motor 720, the bottomhole assembly 730, the drillstring 710, the drill bit 735 and/or the like. The sensors 715 may make measurement while the drill bit 735 is being used to drill the borehole. The parameters measured/sensed by the sensors 715 may be communicated to a processor 740. The processor 740, in accordance with an embodiment of the present invention, may generate a first set of relationships from the first set of operating parameters to enable the rotor speed and rotor torque to be predicted over a range of operating parameter values, determine from the relationships a first more optimal mode of operation of the downhole motor, and/or generate an output for changing at least one operating parameter to move the operation of the rotor and stator towards the more optimal mode of operation. An output from the processor 740 may be displayed to a driller on a display (not shown) and/or used to control operation of the downhole motor 720, which control may in some cases e provided by varying drilling parameters such as weight-on-bit, hookload, pumping pressure and/or the like.

The invention has now been described in detail for the purposes of clarity and understanding. However, it will be appreciated that certain changes and modifications may be practiced within the scope of the appended claims. Moreover, in the foregoing description, for the purposes of illustration, various methods and/or procedures were described in a particular order. It should be appreciated that in alternate embodiments, the methods and/or procedures may be performed in an order different from that described.

The invention claimed is:

1. A method of optimizing the operation of a hydraulically or pneumatically powered rotor and stator driven drill as it drills a wellbore into the earth, the method comprising:
   (a) measuring a first set of rotor and stator operating parameters comprising flow rate of drilling fluid, pressure drop through the motor, the speed of rotation of the rotor and rotor torque for a first period of time;
   (b) generating a first set of relationships from the first set of operating parameters to enable the rotor speed and rotor torque to be predicted over a range of operating parameter values, the set of relationships comprising relationship between the torque generated by the rotor and the pressure drop due to hydraulic energy transfer to the rotor and relationship between the speed of rotation of the rotor, the flow rate of drilling fluid and pressure drop due to hydraulic energy transfer to the rotor;
   (c) determining from the first set of relationships a first more optimal mode of operation;
   (d) changing at least one operating parameter to move the operation of the rotor and stator towards the more optimal mode of operation; and
   (e) at the first more optimal mode of operation, measuring a second set of rotor and stator operating parameters, generating a second set of relationships comprising relationship between the torque generated by the rotor and the pressure drop due to hydraulic energy transfer to the rotor and relationship between the speed of rotation of the rotor, the flow rate of drilling fluid and the pressure drop due to hydraulic energy transfer to the rotor; determining a second more optimal mode of operation, and altering the operating parameters to move towards the second more optimal mode of operation.

2. The method according to claim 1, wherein the rotor and stator form a positive or cavity displacement motor or a turbine.

3. The method according to claim 1, wherein the measurement of the speed of the motor is made downhole in the vicinity of the rotor.

4. The method according to claim 1, wherein the torque produced by the rotor is measured downhole.

5. The method according to claim 1, wherein the first more optimal mode of operation is a mode providing increased mechanical power output from the motor.

6. The method according to claim 1, wherein in step (d), the at least one operating parameter changed comprises flow rate of drilling fluid through the drill and motor.

7. The method according to claim 1, wherein step (e) is repeated again or as often as desired, until no further optimisation of the performance of the rotor are found.

8. The method according to claim 1, wherein following a period of drilling, the method is carried out again at a later period of time, resulting in a further set of measured operating parameters which are employed to generate a further set of relationships, which may indicate a new further more optimal mode of operation, and the operating parameters can then be altered to move towards this new further mode of operation.

9. The method according to claim 1, wherein following a period of drilling, the method is carried out again at a later period of time, resulting in a further set of measured operating parameters which are employed to generate a further set of relationships, which are employed to monitor and diagnose problems arising during drilling.

10. The method according to claim 1, wherein the method is carried out repeatedly whilst drilling, to provide a real-time determination of the hydraulic performance of the rotor and stator and to enable continuous adjustment and optimisation to occur as drilling progresses.

11. A downhole drilling system, comprising:
(a) a bottomhole assembly comprising a drill bit;
(b) a downhole motor comprising a rotor and a stator coupled to the bottomhole assembly and configured in use to drive the drill bit;
(c) one or more sensors for measuring a first set of rotor and stator operating parameters comprising flow rate of drilling fluid, pressure drop through the motor, the speed of rotation of the rotor and rotor torque for a first period of time; and
(d) a processor configured to:
generate a first set of relationships from the first set of operating parameters to enable the rotor speed and rotor torque to be predicted over a range of operating parameter values, the first set of relationships comprising relationship between the torque generated by the rotor and the pressure drop due to hydraulic energy transfer to the rotor and relationship between the speed of rotation of the rotor, flow rate of drilling fluid and the pressure drop due to hydraulic energy transfer to the rotor;
determine from the first set of relationships a first more optimal mode of operation of the downhole motor; and
generate an output for changing at least one operating parameter to move the operation of the rotor and stator towards the more optimal mode of operation.

12. The system according to claim 11, wherein the rotor and stator form a positive or cavity displacement motor or a turbine.

13. The system according to claim 11, wherein the measurement of the speed of the motor is made downhole in the vicinity of the rotor.

14. The system according to claim 11, wherein the torque produced by the rotor is measured downhole.

15. The system according to claim 11, wherein the more optimal mode of operation is a mode providing increased mechanical power output from the motor.

16. The system according to claim 11, wherein the operating parameter changed is selected from the list comprising weight applied to the drill bit, rotation speed of the drill string and flow rate of drilling fluid through the drill and motor.

17. The system according to claim 11, further comprising a drillstring comprising wired pipe for communicating an output from the sensors or the processor to a surface location.

18. The system according to claim 11, further comprising a display for displaying the output from the processor.

19. The system according to claim 11, further comprising a controller configured to receive the output from the processor and control operation of the downhole motor.

20. The method according to claim 1, wherein the rotor and stator are attached to a drill string and in step (d), the at least one operating parameter which is changed comprises rotation speed of the drill string.

21. The system according to claim 11, wherein the processor is configured to be able to generate an output for changing the flow rate of drilling fluid through the drill and motor.

22. The system according to claim 11, wherein the drilling system comprises a drill string to which the downhole motor is attached and wherein the processor is configured to be able to generate an output for changing the rotation speed of the drill string.

* * * * *